Patented Sept. 7, 1937

2,092,132

UNITED STATES PATENT OFFICE 2,092,132

METHOD OF TREATING TITANIUM BEARING ORES

Reginald Hill Monk and Archibald Stewart Ross, Montreal, Quebec, Canada, assignors to American Zinc, Lead & Smelting Company, St. Louis, Mo., a corporation of Maine No Drawing. Application July 24, 1935, Serial No. 32,972

6 Claims. (Cl. 23—117)

This invention relates to titanium bearing ores and has for its object to obtain therefrom titanium sulfate of uniform quality.

In the treatment of titanium bearing ores various methods have been proposed in which sulfuric acid, with or without the addition of nitre cake in various proportions, has been used to produce a water soluble cake from which titanium dioxide may be obtained by hydrolysis of the solution prepared by its lixiviation. Usually, when sulfating such ores, notice is taken only of the total percentage of iron and titanium present, and there is no adaptation to the composition of the ore in the method of adding the requisite quantity of sulfuric acid. Theoretical quantities of the acid to produce the desired characteristic solution have heretofore been used in a single operation. These "solutions" are not homogeneous, but consist of mixtures of normal and basic sulfates together with unattacked material in mechanical colloidal suspension, and the proportion of the various constituents changes both with the ore and the reagents used to attack it, as well as with the temperature at which the reaction is caused to take place. Variations in the character of the solution used for hydrolysis, even though small, exert a profound influence on the quality of the titanium dioxide which results. Solutions which contain a mixture of basic titanium sulfates of various compositions and various degrees of stability render the control of hydrolysis uncertain and produce unsatisfactory results. Furthermore, the colloidal constituents of the solution are removable only with difficulty, and, if not removed completely, their presence, even in small traces, has a deleterious effect on the product. Therefore a homogeneous solution is important, and by the present invention a solution of exceptional homogeneity is prepared by differential solution.

In ore commercially used for the production of titanium dioxide the constituents are ferro-titanate together with either haematite or rutile, free or in solid solution in the ferro-titanate. The ferro-titanate is much more easily attacked by sulfuric acid than the rutile, and by the present invention there is secured, during the process of sulfation, a temporary separation of the ferro-titanate from the rutile which leads eventually to the homogeneity of the final solution. This is brought about by first treating the ore, ground to 200 minus mesh, with a dilute solution of sulfuric acid. For the ores cited above, the amount of acid employed in this first treatment is limited to approximately the amount of acid required to convert any iron oxide present and the ferro-titanate to ferrous sulfate and titanyl sulfate, $TiO.SO_4$.

A second addition of dilute sulfuric acid is then made and this converts the titanyl sulfate to the normal sulfate $Ti(SO_4)_2$. At suitable temperatures and concentrations of acid very little of the rutile is attacked, owing to its relative insolubility, and the basic sulfates of titanium are readily transformed to the normal type in the presence of sufficient acid.

At this stage acid sufficient to attack the rutile is added slowly. In this way the rutile is gradually converted through the basic sulfate stage to the normal sulfate.

By this method of progressive attack and solution with dilute sulfuric acid the presence of basic sulfates is practically avoided, and a higher percentage of the titanium content is recovered than is possible by other methods. This is due to the fact that the rutile is attacked and dissolved through the basic sulfate to the normal sulfate without there at any time occurring conditions of acid concentration and temperature which lead to production of insoluble layers of basic sulfate around the particles of the rutile.

The invention is illustrated by the following example, but it is to be expressly understood that such data as is given therein applies only to the composition of the ore, the concentration of acid, and the temperature employed. A change in the composition of the ore will necessitate a corresponding change in the amount of acid required for each phase of the treatment, and further the concentration of the acid and the temperature may be varied within reasonable limits. As an example, ore containing 65% $TiO_2$ and 30% FeO may be considered to have a composition of 63% $FeTiO_3$ and 32% $TiO_2$. To 1000 pounds of such ore 1264 pounds of sulfuric acid, specific gravity 1.55, are added and the whole is heated to a temperature of approximately 175° C., with constant stirring. It will be noted that the solution of sulfuric acid employed is one containing approximately one gram $H_2SO_4$ per cubic centimeter of the solution. A part (ranging from 3% to 15%) of the sulfuric acid required for this step may be replaced by its equivalent of acid sodium sulfate (nitre cake). This prevents too sudden a reaction between the ferro-titanate and the acid and gives a greater measure of solubility when further additions of dilute sulfuric acid are made. The temperature of approximately 175° C. is maintained and the agitation continued until the mixture thickens, and then a second addition of 632 pounds of dilute sulfuric acid of specific gravity approximately 1.55 is made and the temperature is maintained at about 175° C., with constant stirring, as before, until the mixture again thickens.

Finally 1220 pounds of dilute sulfuric acid specific gravity approximately 1.55 are added in batches of 250 pounds at a time, stirring meanwhile, and allowing the mixture to thicken each time before adding the next additional batch, the temperature being maintained at approximately 175° C. until a friable powder is formed.

The product of this reaction is characterized by its softness and uniformity and when lixiviated in the usual manner it shows a high solubility and freedom from colloidal or suspended particles.

It will be understood, as indicated above, that with different ores, the amount of sulfuric acid required for each phase of the treatment, and also the concentration of acid and the temperature should be varied within reasonable limits to produce the maximum results, and such variations are within the contemplation of the appended claims.

It will be further understood that in the first addition of sulfuric acid only sufficient acid is employed to attack in the ore the titanium which is combined with iron as iron titanate to form with it a basic sulfate. The subsequent addition of acid may be made either in batches, as stated, or continuously as the reaction proceeds, and takes the titanium content of the ore through definite natural stages to the disulfate $Ti(SO_4)_2$.

What is claimed is:

1. The process of obtaining titanium sulfate from ores containing ferro-titanate, which consists in first subjecting the ore to the action of sulfuric acid the amount of acid being limited to approximately that required to convert the titanium in the ferro-titanate to titanyl sulfate $(TiO.SO_4)$, and then after said conversion adding sufficient dilute sulfuric acid to convert the basic sulfates to normal titanium sulfate.

2. The process of obtaining titanium sulfate from titanium bearing ores which consists in first subjecting the ore to the action of dilute sulfuric acid, the amount of acid being limited to approximately that required to convert the titanium in the ore that is combined with iron as ferro-titanate to only a basic titanium sulfate, heating the mass to approximately 175° C., with agitation, until the mass thickens, and then adding a dilute solution of sulfuric acid while maintaining a temperature of approximately 175° C., and continuing the agitation until all the ferro-titanate has been converted to iron sulfate and titanium disulfate, and then slowly adding additional dilute sulfuric acid and maintaining the temperature at approximately 175° C., and continuing the agitation until all the titanium content of the ore has been converted to titanium disulfate and the mass is a friable powder.

3. The process of obtaining titanium sulfate from titanium bearing ores which consists in first subjecting the ore to the action of dilute sulfuric acid the amount of which is limited to approximately that required to convert the titanium that is combined with iron in the ore to only a basic sulfate, heating the mass to approximately 175° C., with agitation until the mass thickens and then maintaining the temperature, and adding a dilute solution of sulfuric acid as the reaction proceeds between the acid and the titanium content of the ore until the whole of the titanium has been converted to the normal sulfate and the mass is in a friable condition.

4. A differential process of obtaining titanium sulfate of homogeneous composition from titanium bearing ores containing ferro-titanate, which consists in first subjecting the ore to the action of dilute sulfuric acid under heat and agitation, the amount of acid being limited to approximately that required to convert the ferro-titanate in the ore to basic titanium sulfate, and then treating the ore in successive steps with dilute sulfuric acid under heat and agitation, and pausing between the said successive steps to permit the reaction of the acid added at each step to take place, the step by step addition of the acid being continued until the conversion of the titanium content of the ore to the disulfate is complete.

5. A differential process of obtaining titanium sulfate of homogeneous composition from titanium bearing ores containing ferro-titanate and rutile, which consists in first subjecting the ore to the action of dilute sulfuric acid under heat and agitation, the amount of acid being limited to approximately that required to convert the ferro-titanate in the ore to only basic titanium sulfate, and then making successive additions of dilute sulfuric acid with a pause between such additions, said additions being continued until the basic titanium sulfate from the first step and the rutile in the ore are converted to titanium disulfate.

6. The process of treating an ore containing ferro-titanate and rutile, which consists in comminuting the ore to approximately 200 minus mesh, treating the comminuted ore with sulfuric acid in an amount sufficient to convert the ferro-titanate and any iron oxide present to titanyl sulfate $(TiO.SO_4)$ and ferrous sulfate, then converting the titanyl sulfate to the normal sulfate $Ti(SO_4)_2$ by the addition of dilute sulfuric acid, and then slowly adding sufficient dilute sulfuric acid to gradually convert the rutile through the basic sulfates, $Ti_2O(SO_4)_3$ and $TiO.SO_4$, to the normal sulfate, $Ti(SO_4)_2$.

REGINALD HILL MONK.
ARCHIBALD STEWART ROSS.